United States Patent [19]

Sikich

[11] 3,940,867
[45] Mar. 2, 1976

[54] GUIDANCE VALVE FOR FISH PUMPS

[76] Inventor: Matthew John Sikich, 3171 Westmount Place, West Vancouver, British Columbia, Canada

[22] Filed: July 16, 1974

[21] Appl. No.: 488,915

[52] U.S. Cl. ................................................. 43/6.5
[51] Int. Cl.² ........................................ A01K 79/00
[58] Field of Search ....................................... 43/6.5

[56] References Cited
UNITED STATES PATENTS

| | | | |
|---|---|---|---|
| 1,361,691 | 12/1920 | Davis | 43/6.5 |
| 2,163,282 | 6/1939 | Hovden | 43/6.5 |
| 3,421,245 | 1/1969 | Lerch | 43/6.5 |

Primary Examiner—Louis G. Mancene
Assistant Examiner—Daniel J. Leach
Attorney, Agent, or Firm—Carver and Company

[57] ABSTRACT

An intake guidance valve for connection to an intake opening of a fish pump having a frusto-concial shield open at its small end and at its base. A conical deflector is mounted on and axially of the shield in a plurality of vanes which extend at an end beyond the base of the shield and at their other ends towards but short of the apex of the deflector so as to provide a plurality of upwardly tapering guidance passages. An annular flange projects radially from the base of the deflector so that water and fish are drawn radially into the guidance passages.

4 Claims, 3 Drawing Figures

U.S. Patent    March 2, 1976    Sheet 1 of 2    3,940,867
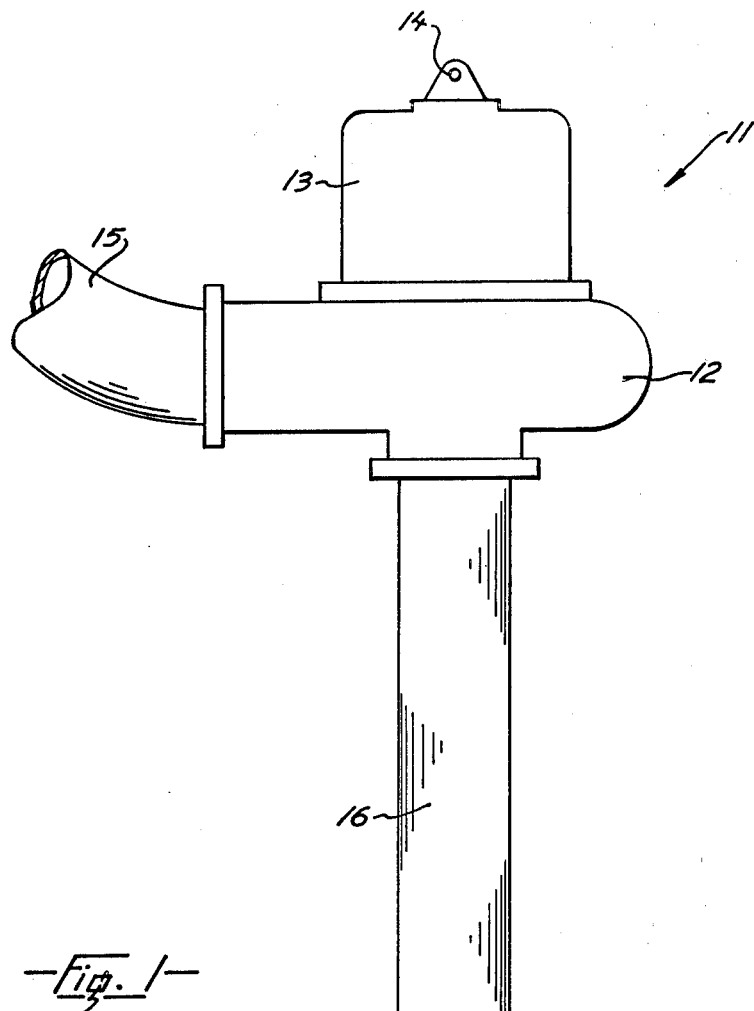
Fig. 1
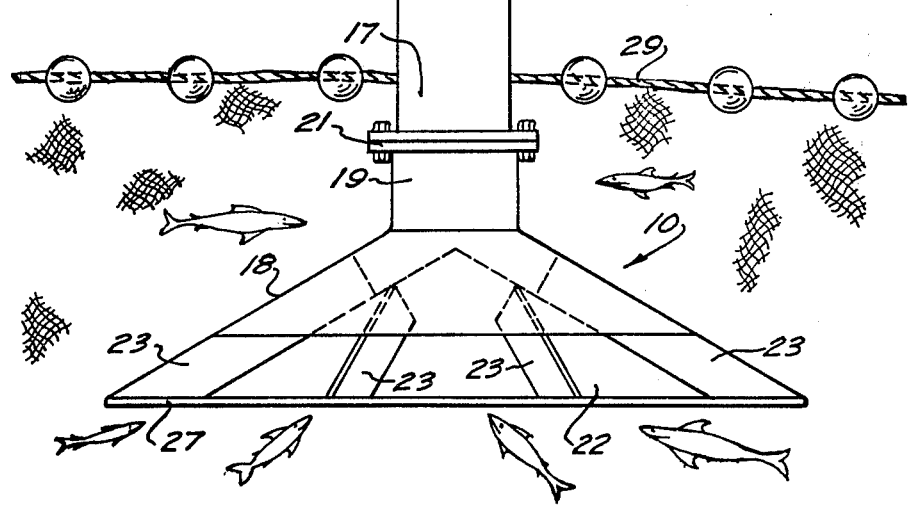

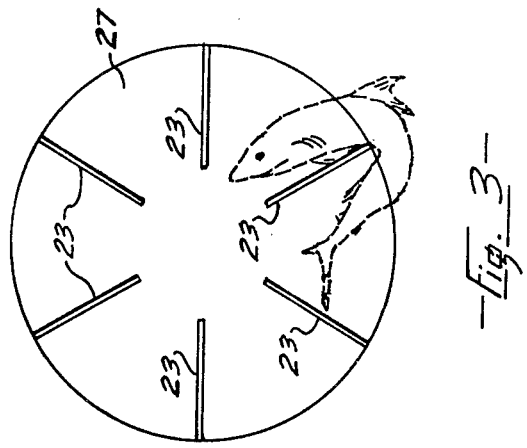
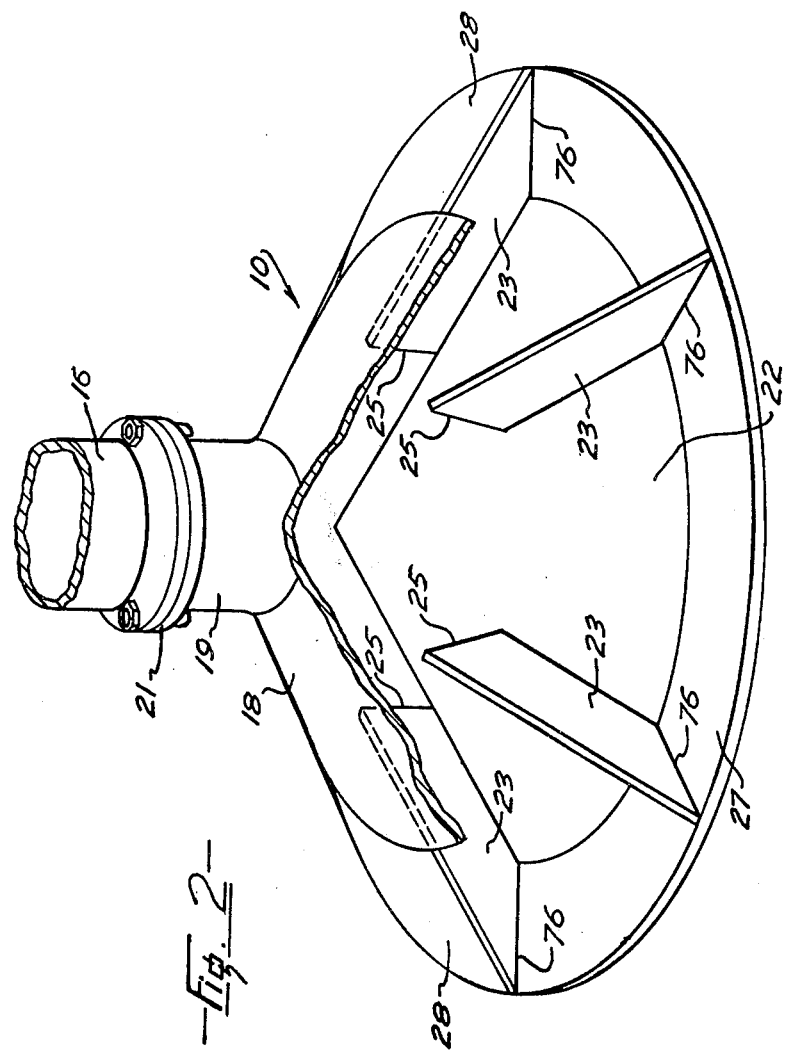

GUIDANCE VALVE FOR FISH PUMPS

BACKGROUND OF THE INVENTION

1. Field of the Invention

This invention relates to apparatus for pumping fish from nets and the like into holds of fishing vessels and, in particular to a fish guidance valve adapted to be attached to a pump intake.

2. Prior Art

For many years transfer of fish from a purse seine or a similar net to the hold of a fishing vessel has, traditionally, been accomplished by means of a brailer, use of which is very difficult and also results in serious loss of fish and damage to net and brailing gear.

Of recent years pump apparatus has been developed which permits the fish to be pumped directly from the net into the hold of the boat. In some types of pump apparatus, large pumps have been installed on the deck of the fishing vessel from which a suction hose can be extended into the net which is drawn along side the boat and the fish then pumped into the vessels hold. In other types of pump apparatus the pump itself is suspended in the concentration of fish and has a suction opening through which fish are drawn and which are then pumped upwards into the hold through a discharge hose.

In both types of pump apparatus the suction opening is normally bell-mouthed and is provided with a screen, the openings of which are of a size sufficient to allow fish to pass through but prevent passage of the net and large objects. The screen openings must be several times larger than the fish being pumped so that more than two fish can go through the opening at one time to prevent jamming and also to allow small fish to pass through cross-wise. The large openings thus allow the passage of large predatory fish, such as dog fish, which can pass through either tail first or head first. As with most pumps of this nature of the centrifugal type, dog fish which pass into the suction opening of the pump tail first very often "ball up" in the vanes of the centrifugal pump and can jam the pump or the hose.

SUMMARY OF THE INVENTION

The present invention provides an intake guidance apparatus for either a deck mounted pump or a submersible pump which reduces the tendency of large predatory fish, such as dog fish, from entering the pump tail first.

The intake guidance valve of the present invention has a frusto-conical shield open at each end, connectable at its smaller end to the intake of the pump apparatus, a substantially conical deflector disposed in and co-axially of the shield and spaced from walls of the shield so as to provide a tapering annular passage, the deflector extending outwards of the open end of the shield, an annular flange extending radially from the base of the deflector and spaced outwardly of the base of the shield, guidance vanes disposed between the walls of the deflector and the shield dividing the annular passage into a plurality of upwardly tapering guidance passages, said vanes extending from the annular flange towards, but short of the apex of the deflector.

A detailed description following, related to the drawings, gives exemplification of apparatus according to the invention which, however, is capable of expression in means other than those particularly described and illustrated.

DESCRIPTION OF THE DRAWINGS

FIG. 1 is an elevational view of the intake guidance valve secured to the conventional fish pump, FIG. 2 is a perspective view of the guidance valve with portions thereof broken away for purposes of clarity, FIG. 3 is a plan view of the valve, a portion of the housing being broken away for purposes of clarity.

DETAILED DESCRIPTION

Referring to the drawings, and in particular to FIG. 1, a fish guidance valve, generally 10, of the invention is shown in association with pump apparatus, generally 11. The apparatus 11 which is typical of many such pump apparatuses includes a centrifugal pump 12 which is driven by a hydraulic motor 13. Operating fluid to the motor is supplied through flexible conduits (not shown) which extend from a suitable pump (not shown) on the vessel (not shown). The motor and combined pump are provided with a bracket 14 to which supporting lines from the vessel are secured for suitably positioning the pump over the side of the vessel.

The pump has a flexible discharge conduit 15 which carries discharge from the pump into the hold of a vessel. The pump also has a central suction pipe 16, at the lower end 17 of which, the valve 10 is secured.

Referring to FIGS. 2 and 3, the valve 10 has a frusto-conical shield 18 from the upper end of which a short cylindrical discharge section 19 extends, which, as shown in the drawings, is provided with a flange 21 for providing a bolted connection to the end of the suction pipe. Other types of connectors can obviously be used.

A conical deflector 22 is supported inside and co-axially of the shielf by a plurality of vanes 23, six being shown, which follow the taper of the cone and shield and which are secured as by welding along their upper edges to the shield and along the lower edges to the deflector. The vanes are spaced equidistantly apart and terminate at their upper ends, severally 25, short of the apex of the deflector, and divide the annular passage between the shield and the deflector into a plurality of upwardly tapering guidance passages.

The vanes also extend outwards of the shield at their lower ends, severally 76, and carry a circular base plate 27 which is spaced from the lower or flared end of the shield to provide openings 28. Diameter of the base plate is greater than diameter of the flared or lower end of the shield so that it projects as an annular flange, outwards of the base of the deflector.

Dimensional relationship of the various parts of the valve as above described is such that the width of openings 28 between the lower edge of the shield and the base plate is roughly equal to the distance measured perpendicularly between the shield and the deflector. Length of the vanes is such that at their upper ends they are spaced apart a distance approximately equal to the distance between the cone and shield.

In use, refer to FIG. 1, the valve is immersed in water within the purse seine 29 just below the greatest concentration of fish which normally tend to gather near the surface, and is moved back and forth. The fish, such as herring, are sucked radially into the valve. As they do so the vanes help align the fish with the flow of water so that they can pass head first into the suction pipe and thence through the pump and discharge conduit into the hold of the vessel.

FIG. 3 illustrates the action of the valve to obtain directional guidance of a large predatory fish, such as a dog fish, 31. Fish of this nature have a long torpedo-like body which is very flexible and which offers very little resistance to the passage of water in a head to tail direction, but offers considerable resistance to passage of water in a tail to head direction. Such fish when trapped in a purse seine usually swim in a horizontal position and when approached by the suction device attempt to swim away from it. Consequently, the fish is sucked sideways to the valve. The vanes are spaced apart at their lower edges a distance approximately two thirds the length of the largest fish that the valve and pump are designed to accommodate, consequently, such a fish will, when sucked sideways meet at least one of the vanes and due to its flexible nature will bend over the vane with its head and tail extending into adjacent passages. As water entering the guidance passages passes over the tail portion of the fish in a head to tail direction and over the head portion in a tail to head direction, the greater resistance offered by the head portion will result in the fish moving into the valve head first. Once it obtains this head first attitude it is maintained in that attitude by the vanes themselves and also by the effect of the increased drag of the water on the head of the fish as velocity of the water increases towards the discharge end of the valve. The fish, therefore, passes up the suction pipe and into the pump head first, a condition which enables a centrifugal pump to handle the fish without its being "balled up" and passes it through the discharge conduit, also in a head first condition.

It is apparent that although the valve is illustrated and described as an overall conical shape, a valve similarly constructed having a pyramoidal shape would suffice. Consequently, in the claims hereafter appended, reference to the valve and its components having a conical aspect shall mean and include a valve having a pyramoidal aspect.

I claim:

1. An intake guidance valve for fish pump apparatus having a centrifugal pump comprising:
   a. a substantially frusto-conical shield open at each end connectable at its smaller end to the intake of the pump apparatus,
   b. a substantially conical deflector disposed in and co-axially of the shield and spaced from walls of the shield so as to provide a tapering annular passage, the deflector extending outwards of the open end of the shield,
   c. an annular flange extending radially from the base of the deflector and spaced from the base of the shield,
   d. guidance vanes disposed between the walls of the deflector and the shield dividing the annular passage into a plurality of upwardly tapering guidance passages, said vanes extending from the annular flange towards, but short of the apex of the deflector.

2. A valve as claimed in claim 1 in which the annular flange is a peripheral portion of a circular base plate, secured to the base of the deflector.

3. A valve as claimed in claim 1 in which the length of the vane is such that the guidance passages terminate in discharge openings having substantially the same breadth and depth.

4. A valve as claimed in claim 1 in which the ends of the vanes projecting from the shield are spaced apart a distance substantially two thirds the length of the largest fish which can pass through the guidance passages.

* * * * *